United States Patent [19]

Yamazaki et al.

[11] Patent Number: 6,025,429

[45] Date of Patent: *Feb. 15, 2000

[54] GRANULATED ACETYLENE BLACK, PROCESS FOR ITS PRODUCTION AND ITS APPLICATION

[75] Inventors: Yoshiteru Yamazaki; Kazuyoshi Tsuruta; Mitsuyoshi Noguchi, all of Omuta, Japan

[73] Assignee: Denki Kagaku Kogyo Kabushiki Kaisha, Tokyo, Japan

[*] Notice: This patent is subject to a terminal disclaimer.

[21] Appl. No.: 09/132,516

[22] Filed: Aug. 11, 1998

Related U.S. Application Data

[62] Division of application No. 08/777,669, Dec. 20, 1996.

[30] Foreign Application Priority Data

Jan. 19, 1996 [JP] Japan ......................................... 8-7402

[51] Int. Cl.[7] .................................................... C09C 1/48
[52] U.S. Cl. ........................ 524/495; 423/449.1; 423/458; 23/314
[58] Field of Search .................................. 423/449.1, 458; 252/511; 524/495; 106/472, 476; 23/314

[56] References Cited

U.S. PATENT DOCUMENTS

| | | | |
|---|---|---|---|
| 4,493,787 | 1/1985 | Taniguchi et al. | ...................... 252/511 |
| 4,608,244 | 8/1986 | Sugihara et al. | ...................... 423/449.1 |
| 5,480,626 | 1/1996 | Klasen et al. | ......................... 423/449.1 |

FOREIGN PATENT DOCUMENTS 35 12 479  10/1985  Germany .

OTHER PUBLICATIONS

Database WPI, Derwent Publications, AN–89–124671, HU–A–47 615, Mar. 28, 1989.

Database WPI, Derwent Publications, AN–87 068112, JP–A–62 020 565, Jan. 29, 1987, & JP–B–03 049 941, Jul. 31, 1991.

Database WPI, Derwent Publications, AN–88–193704, JP–A–63 130 643, Jun. 2, 1998.

Database WPI, Derwent Publications, AN–88–327871, JP–A–63 243 149, Oct. 11, 1988.

*Primary Examiner*—Steven P. Griffin
*Assistant Examiner*—Stuart L. Hendrickson
*Attorney, Agent, or Firm*—Oblon, Spivak, McClelland, Maier & Neustadt, P.C.

[57] ABSTRACT

Granulated acetylene black having a bead strength of at least 5 g/grain, a bulk density of at least 0.2 $g/cm^3$ and a grit content of at most 10 ppm.

8 Claims, 1 Drawing Sheet

GRANULATED ACETYLENE BLACK, PROCESS FOR ITS PRODUCTION AND ITS APPLICATION

This is a division of application Ser. No. 08/777,669, filed on Dec. 20, 1996.

The present invention relates to granulated acetylene black which is capable of imparting excellent dispersibility and high electrical conductivity to a resin and/or rubber and which is less susceptible to dusting, a process for its production and its application.

Acetylene black belongs to an intermediate class between graphite and amorphous carbon, and it has a large specific surface area and a stereostructure (hereinafter referred to as "the structure") wherein primary particles are chained to one another. It is carbon black of high purity, which is substantially free from a possibility of inclusion of impurities, and it is used as an agent for imparting electrical conductivity to a resin and/or rubber, or for electric cells. Acetylene black has a low bulk density, and when added to a resin and/or rubber, it is used mainly in a granulated form, taking dusting or processablity during the kneading into consideration.

For granulation of acetylene black, an agitation granulation system is employed like in the case of other carbon blacks. The agitation granulation system is a system wherein carbon black and a wetting agent or an organic binder, are stirred and mixed for granulation, whereby it is possible to obtain granulated particles having a relatively uniform particle size. As an example, JP-B-1-58227 (U.S. Pat. No. 4,608,244) discloses a system wherein acetylene black feed powder having an iodine adsorption of at least 95 mg/g is granulated by using deionized water as the wetting agent. Granulated acetylene black obtained by this system has a feature that its bead strength is as low as less than 5 g/grain, as the importance is laid on its dispersibility for its use as an agent for imparting electrical conductivity to a resin and/or rubber, and it is granulated only with deionized water without adding an organic binder, so that agglomerated particles will not remain in the matrix.

However, with conventional granulated acetylene black, the structure is developed, and the bead strength is accordingly low as compared with usual conductive carbon black. Accordingly, when it is to be kneaded into a resin and/or rubber, it is likely to dust and scatter out of the system, whereby acetylene black can be incorporated into the resin and/or rubber only in an amount less than the charged amount (the ratio of the amount of acetylene black incorporated to the resin and/or rubber to the charged amount will be hereinafter referred to as "acetylene black yield"), and it tends to be difficult to impart the electrical conductivity as designed.

On the other hand, air transportation is sometimes employed as a method for transporting acetylene black to be kneaded. There has been a problem that during such air transportation, the particles to be granulated are likely to be broken by collision against the inner wall of the pipeline for transportation and undergo dusting after the transportation. Further, a long kneading time has been required for kneading acetylene black with a resin and/or rubber due to dusting by breakage of particles at the initial stage of kneading or for the reason of a low bulk density. If a high sharing force is imparted to shorten the kneading time, the structure tends to be broken, whereby the desired properties of acetylene black such as electrical conductivity and reinforcing property tend to be impaired. Accordingly, it is important that an agent for imparting electrical conductivity to a resin and/or rubber has a small scattering loss at the time of kneading (i.e. a high acetylene black yield) and is excellent in dispersibility and free from contamination with an organic binder, and development of such an agent has been desired.

Acetylene black has the developed structure and can not be granulated unless the water content is increased as compared with other carbon blacks. If the water content is increased, voids in dried particles to be granulated will increase, whereby the bead strength and the bulk density will decrease. To carry out granulation with the water content reduced, it is conceivable to increase the stirring time or the stirring speed of the granulation machine such as a Henshel mixer, but, in such a case, the bead strength can not be increased, and the structure of acetylene black is likely to be broken, whereby the electrical conductivity of the resin composition and/or rubber composition will not sufficiently be improved. Accordingly, in order to improve the bead strength of acetylene black, it is effective to add an organic binder, but in such a case, the binder will remain in the particles to be granulated, whereby the dispersion tends to be impaired due to an increase of impurities or segregation of agglomerated particles, and the properties of the resin composition and/or rubber composition tend to deteriorate.

The present invention has been made under these circumstances, and it is an object of the present invention to provide granulated acetylene black having high bead strength and excellent dispersibility, so that it can be adequately incorporated to a resin and/or rubber, and thus has a high ability of imparting electrical conductivity, without employing an organic binder.

Such an object of the present invention can be accomplished by producing granulated acetylene black by blending deionized water to acetylene black feed powder, in an amount in excess of the amount of water required for granulation of such powder, followed by granulation of a first stage to obtain a granulated product, and then blending acetylene black feed powder to this granulated product, followed by granulation of a second stage. The granulated acetylene black thus obtained has characteristics such that the bead strength is at least 5 g/grain, the bulk density is at least 0.2 g/cm³ and the grit content is at most 10 ppm, and structurally, it is characterized by a structure having a coating layer of acetylene black formed on the surface of granulated acetylene black, in other words, a coreshell structure.

That is, the present invention provides:

1. Granulated acetylene black having a bead strength of at least 5 g/grain, a bulk density of at least 0.2 g/cm³ and a grit content of at most 10 ppm.
2. The granulated acetylene black according to above 1, which has an ash content of at most 100 ppm.
3. The granulated acetylene black according to above 1, wherein the bead strength is from 5 to 10 g/grain, the bulk density is from 0.25 to 0.4 g/cm³, the grit content is at most 10 ppm, and the ash content is at most 50 ppm.
4. The granulated acetylene black according to above 3, wherein the grit content is at most 1 ppm.
5. Granulated acetylene black having a coating layer of acetylene black formed on the surface of granulated acetylene black.
6. The granulated acetylene black according to above 5, which has a bead strength of at least 5 g/grain, a bulk density of at least 0.2 g/cm³ and a grit content of at most 10 ppm.
7. The granulated acetylene black according to above 6, which has an ash content of at most 100 ppm.
8. The granulated acetylene black according to above 5, which has a bead strength of from 5 to 10 g/grain, a bulk density of from 0.25 to 0.4 g/cm³, a grit content of at most 10 ppm and an ash content of at most 50 ppm.
9. The granulated acetylene black according to above 8, wherein the grit content is at most 1 ppm.
10. Granulated acetylene black having a coreshell structure.
11. The granulated acetylene black according to above 10, which has a bead strength of at least 5 g/grain, a bulk density of at least 0.2 g/cm³ and a grit content of at most 10 ppm.
12. The granulated acetylene black according to above 11, which has an ash content of at most 100 ppm.
13. The granulated acetylene black according to above 10, which has a bead strength of from 5 to 10 g/grain, a bulk density of from 0.25 to 0.4 g/cm³, a grit content of at most 10 ppm, and an ash content of at most 50 ppm.
14. The granulated acetylene black according to above 13, wherein the grit content is at most 1 ppm.
15. A process for producing granulated acetylene black, which comprises blending from 200 to 350 parts by weight of deionized water to 100 parts by weight of acetylene black feed powder, followed by granulation of a first stage to obtain a granulated product, and then blending from 10 to 50 parts by weight of acetylene black feed powder to 100 parts by weight of the granulated product, followed by granulation of a second stage.
16. A composition comprising a resin and/or rubber, and the granulated acetylene black as defined in any one of above 1 to 14, incorporated thereto.
17. A composition for a semi-conductive shield for a cable, comprising a resin and/or rubber which is at least one member selected from the group consisting of an ethylene/vinyl acetate copolymer, an ethylene/ethyl acrylate copolymer and an ethylene/butyl acrylate copolymer, in a total amount of 100 parts by weight, and the granulated acetylene black as defined in any one of above 1 to 14, blended thereto, in an amount of from 30 to 100 parts by weight.

Now, the present invention will be described in detail.

As is well known, acetylene black feed powder to be used in the present invention, can be prepared by maintaining the temperature for pyrolysis of acetylene gas at a level of at least 2000° C., preferably at least 2200° C. As a pyrolytic furnace for this purpose, the one disclosed in JP-A-56-90860 may, for example, be used. Further, it is possible to control the temperature for pyrolysis by introducing hydrogen gas, an inert gas or the like, during the pyrolysis of acetylene gas, to obtain acetylene black having an iodine adsorption of from 20 to 110 mg/g (JP-B-3-49941). If acetylene black feed powder thus obtained, is granulated by a conventional agitation granulation system, it is impossible to obtain granulated particles intended by the present invention. Further, the bead strength and the bulk density of the granulated particles of acetylene black are in a positive interrelation, and when the granulation conditions are the same, the larger the iodine adsorption of acetylene black, the lower the bead strength and the bulk density of granulated particles. Accordingly, even if granulation is carried out taking this into consideration, the results will be the same, and particles having high bead strength and bulk density can hardly be obtained.

The granulated acetylene black of the present invention can be prepared in such a manner that when acetylene black feed material is to be granulated by a conventional agitation granulation system, firstly, in granulation of a first stage, granulation is carried out by an addition of water in excess of the amount required for plasticization i.e. granulation of acetylene black feed powder, and then in granulation of a second stage, granulation is carried out by adding acetylene black feed powder to adjust the water content.

The granulated acetylene black of the present invention thus obtained, has a bead strength of at least 5 g/grain and a bulk density of at least 0.2 g/cm³, and by adjusting the grit content and the ash content of the acetylene black feed powder, it is possible to obtain the product having a grit content of at most 10 ppm, preferably at most 1 ppm and an ash content of at most 100 ppm, preferably at most 50 ppm. Further, structurally, it is characterized by a structure having a coating layer of acetylene black formed on the surface of granulated acetylene black, in other words, by having a coreshell structure like a "boiled egg".

Figure 1:
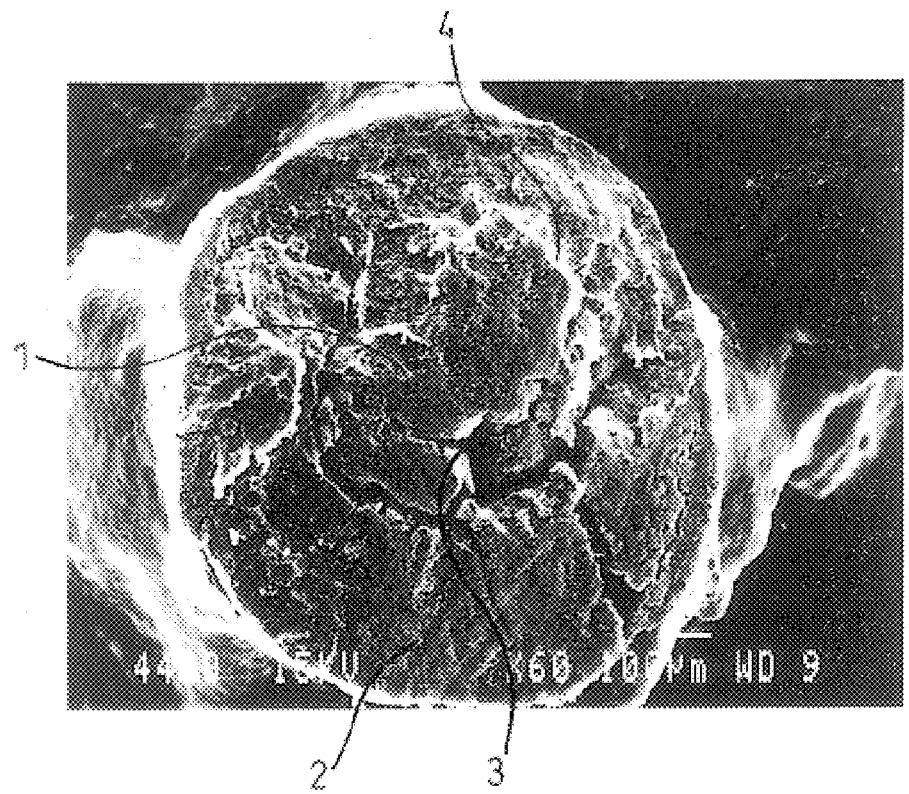
FIG. 1 is an electron microscopic photograph showing a cross-sectional structure of granulated acetylene black of the present invention with 60 magnifications.
Figure 2:
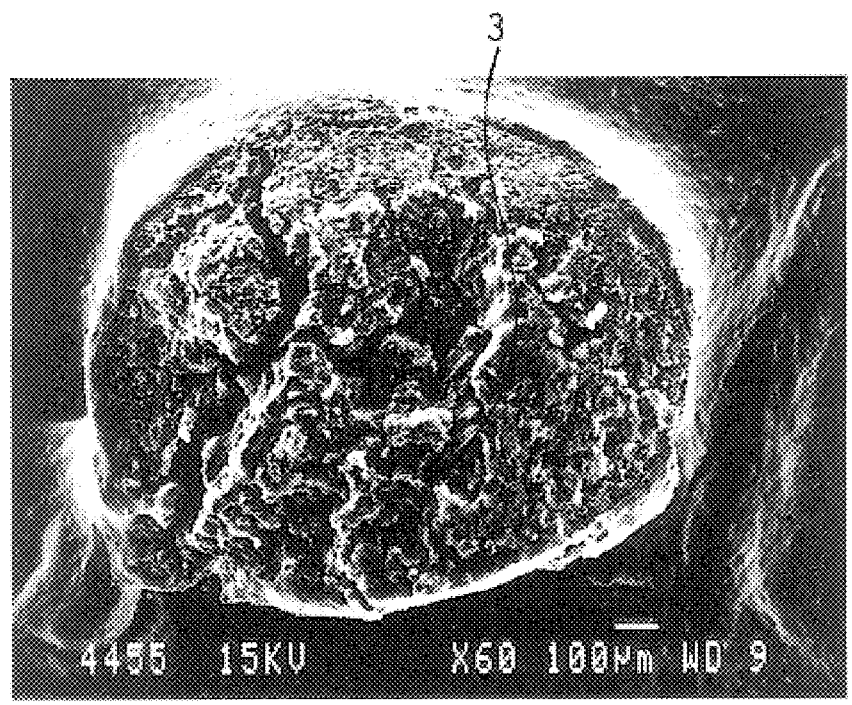
FIG. 2 is an electron microscopic photograph showing a cross-sectional structure of granulated acetylene black of an Comparative Example (prior art).

FIG. 1 is a scanning electron microscope (SEM) photograph showing a cross-section of the granulated acetylene black of the present invention with 60 magnifications, and FIG. 2 is a scanning electron microscope photograph showing a cross-section of conventional granulated acetylene black with 60 magnifications. In these Figures, reference numeral 1 indicates granulated acetylene black constituting the core, numeral 2 indicates a coating layer of acetylene black constituting the shell, numeral 3 indicates a void, and numeral 4 indicates the surface of granulated acetylene black constituting the core.

From comparison of FIGS. 1 and 2, in the granulated acetylene black of the present invention (FIG. 1), the surface 4 of granulated acetylene black formed by granulation of the first stage, is observed, and it is evident that it has a structure having a coating layer of acetylene black formed on the surface of granulated acetylene black, i.e. a coreshell structure. Further, the shell 2 of the granulated acetylene black of the present invention is dense, and the core itself is soft, as a void 3 is observed between the core 1 and the shell 2. Thus, it has a characteristic that if the shell is broken, the core will also be readily pulverized. The shell may be formed into a plurality of layers by repeating the granulation operation. Thus, the bead strength can be changed not only by changing the water content but also by changing the thickness of the shell.

Now, the process for producing the granulated acetylene black of the present invention, will be described. In the granulation of the first stage, a blend of 100 parts by weight of acetylene black feed powder and from 200 to 350 parts by weight of deionized water, is stirred and granulated. If the deionized water is less than 200 parts by weight, water required for granulation will be inadequate, whereby granulation tends to be difficult. On the other hand, if it exceeds 350 parts by weight, granulated particles tend to grow so much that they become agglomerates, and even if acetylene black feed powder is blended in the granulation step of the second stage, the agglomerated particles and the powder tend to remain as separated. Preferably, the blend comprises 100 parts by weight of acetylene black feed powder and from 200 to 350 parts by weight of deionized water, and deionized water is blended so that the water content would be higher by more than 3 wt % and not more than 6 wt % than the water content of Y wt % obtained by the following formula (I), where the iodine adsorption of the acetylene black feed powder is X mg/g, followed by stirring and granulation, whereby a granulated product having a more uniform particle size can readily be obtained:

$$Y = (0.002X^2/\log X) + 60 \quad (I)$$

In granulation of the second stage, from 10 to 50 parts by weight of acetylene black feed powder is blended to 100 parts by weight of the granulated product obtained by granulation of the first stage, followed by stirring and granulation. If the amount of acetylene black feed powder is less than 10 parts by weight, the shell will not substantially be formed, and the bead strength and the particle size of the granulated product tend to be non-uniform. On the other hand, if it exceeds 50 parts by weight, acetylene black feed powder tends to be excessive, and non-granulated powder tends to be substantially contained in the granulated product. In either case, it tends to be difficult to produce a granulated product having high bead strength and bulk density. Preferably, the blend comprises 100 parts by weight of the granulated product of the first stage and from 10 to 50 parts by weight of the acetylene black feed powder, and the acetylene black feed powder is blended so that the water content would be lower by 2 to 10 wt % than the water content of Y wt % obtained by the formula (I), followed by stirring and granulation, whereby a granulated product having a uniform particle size and high bead strength and bulk density, can readily be obtained.

The acetylene black feed powder to be used in the present invention, is preferably the one prepared by pyrolysis of acetylene gas at a temperature of at least 2000° C., preferably at least 2200° C. Particularly preferred is the one having the ash content reduced to at most 200 ppm and the grit content reduced to at most 10 ppm by adjusting the acetylene black concentration in air to a level of from 0.1 to 1 kg/m³ and passing it at least twice through an air classification machine. As the air classification machine, any one of centrifugal type, inertia type and gravity type classifiers, may be employed. However, an inertia type classifier, particularly a Vantongeren type classifier, is preferred (See JP-B-58-54876; UK Patent 2,064,994).

The granulated acetylene black of the present invention has remarkably high levels of bead strength and bulk density i.e. a bead strength of at least 5 g/grain and a bulk density of at least 0.2 g/cm³. This is believed attributable to the fact that the shell is more highly densed than the core by virtue of the coreshell structure. Accordingly, when the granulated acetylene black of the present invention is kneaded to a resin and/or rubber, the acetylene black yield can be made high, and when a sharing force is exerted at the initial stage of kneading, the coating layer will be broken and readily be dispersed into the resin and/or rubber, whereby the dispersibility will also be improved, and electrical conductivity can be imparted as designed. Further, a high level of loading is possible, whereby it is possible to produce a resin composition and/or rubber composition having a distinctly higher level of electrical conductivity than conventional compositions.

In the present invention, the bead strength of the granulated acetylene black is at least 5 g/grain, so that the dispersibility can be maintained at a high level even when it is highly loaded to a resin and/or rubber, the acetylene black yield can be improved, and pulverization during air transportation can be prevented. Further, it may be mentioned that with the granular acetylene black disclosed in JP-B-1-58227, the bead strength of less than 5 g/grain is required, since the amount of loading to a resin and/or rubber is reduced to impart high electrical conductivity and to increase the dispersibility of a coating material, while in the present invention, the bead strength is required to be higher.

In the present invention, the upper limit of the bead strength of the granulated acetylene black is preferably 10 g/grain, for the following reason. Namely, each of acetylene blacks having various bead strength was kneaded to a resin and/or rubber, followed by hot pressing to obtain a shaped product having a thickness of 1 mm, which was cut by a microtome into a specimen having a thickness of 1 μm, whereupon the proportion of agglomerated particles was inspected by an optical microscope, whereby it was confirmed that such agglomerated particles were substantially present in acetylene black having a bead strength exceeding 10 g/grain. Such agglomerated particles bring about non-uniformity in electrical conductivity or mechanical properties of the resin molded product and/or rubber molded product, and in some cases, they substantially deteriorate such properties.

Further, in the present invention, the bulk density of the granulated acetylene black is at least 0.2 g/cm³, because if the bulk density is less than this level, the acetylene black yield tends to be low, and it tends to be difficult to impart electrical conductivity to a resin and/or rubber as designed, and the dispersion rate to the resin and/or rubber tends to be slow, whereby kneading for a long period of time tends to be required. Especially by a continuous kneading machine such as a twin screw extruder, the initial kneading will be required, and the bulk density is preferably at least 0.25 g/cm³. The bulk density and the bead strength are in a positive interrelation, and the bulk density of acetylene black having a bead strength of about 10 g/grain, is about 0.4 g/cm³. Accordingly, the upper limit of the bulk density is preferably at a level of 0.4 g/cm³.

Further, in the present invention, the grit content of the granulated acetylene black is at most 10 ppm, because when the application of the present invention is directed to a composition for a semi-conductive shield for a cable, the grit content impairs the smoothness of the resin molded product and/or rubber molded product, whereby the electrical properties will remarkably be impaired. Especially when the application is directed to a composition for a semi-conductive shield for an ultrahigh voltage cable, the grit content is preferably at most 1 ppm.

Further, in the present invention, taking the durability of the resin composition and/or rubber composition into consideration, the ash content of the granulated acetylene black is preferably at most 100 ppm. Especially when the application of the present invention is directed to a composition for a semi-conductive shield for a cable, it is preferred to reduce the ash content to a level of at most 50 ppm, since ionization of metal impairities will be promoted by the high voltage, whereby an electric tree is likely to form. The acetylene black feed powder to be used in the present invention, is the one produced by pyrolysis of acetylene gas having an extremely small content of metal oxides, and it contains substantially no ash content when prepared, but such an ash content may be included during the subsequent handling or granulation. Accordingly, in the present invention, it is preferred to pass the acetylene black feed powder at least twice through an air classification machine prior to granulation, as mentioned above.

The resin to be used in the present invention may, for example, be an epoxy resin such as a bisphenol type epoxy resin, a phenol novolak type epoxy resin, an alicyclic epoxy resin, a chlorinated ring type epoxy resin, a glycidyl ester type epoxy resin, a glycidyl amine type epoxy resin or a halogenated epoxy resin, a polybenzimidazole, a polybenzoxazole, a polybenzothiazole, a polyoxadiazole, a polypyrazole, a polyquinoxaline, a polyquinazolinedione, a polybenzoxadinone, a polyindolone, a polyquinazolone, a polyindoxyl, a silicone resin, a silicone-epoxy resin, a phenol resin, a melamine resin, a urea resin, an unsaturated polyester, a polyaminobismaleimide, a diallyl phthalate resin, a fluorine resin, a TPX resin, a polyimide, a polyamideimide, a polyetherimide, a polyamide such as amorphous nylon, a polyester such as polybutyl terephthalate or polyethylene terephthalate, a polyphenylene sulfide, a modified polyphenylene ether, a polyallylate, a totally aromatic polyester, a polysulfone, a liquid crystal polymer, a polyether ether ketone, a polyether sulfone, a polycarbonate, a maleimide-modified resin, an ABS resin, an AAS (acrylonitrile/acrylrubber/styrene) resin, an AES (acrylonitrile-ethylene/propylene/diene rubber-styrene) resin, a polyethylene, a polypropylene, or a copolymer resin of e.g. vinyl ethylene acetate or ethyl acrylate.

The rubber to be used in the present invention may, for example, be natural rubber, styrene butadiene rubber, acrylonitrile butadiene rubber, butyl rubber, acryl rubber, ethylene propylene rubber, ethylene propylene tarpolymer, a copolymer rubber of ethylene with an α-olefine, silicone rubber, fluorine rubber, a thermoplastic elastomer such as a polyester, chloroprene rubber, polybutadiene, hydrine rubber or chlorosulfonated polyethylene.

The proportion of the granulated acetylene black of the present invention is preferably from 20 to 200 parts by weight per 100 parts by weight of a resin and/or rubber. Especially when the application of the granulated acetylene black of the present invention is directed to a composition for a semi-conductive shield for a cable, it is preferably from 30 to 100 parts by weight per 100 parts by weight of at least one resin and/or rubber selected from the group consisting of an ethylene/vinylacetate copolymer, an ethylene/ethyl acrylate copolymer and an ethylene/butyl acrylate copolymer.

The granulated acetylene black of the present invention can be used for e.g. coating materials, electric cells or deodorants in addition to the use for an agent for imparting electrical conductivity to a resin and/or rubber.

The physical properties disclosed in this specification, were measured in accordance with the following methods.

(1) Iodine adsorption: JIS K 1474
(2) Bulk density: JIS K 1469
(3) Bead strength: JIS K 6221
(4) Grit content: In accordance with JIS K 6221, the amount of residue having a sieved size of at least 45 $\mu$m, was measured.
(5) Ash content: The operation was carried out in accordance with JIS K 1469 to obtain an ash content in a Pt crucible. This ash content and a flux ($Li_2B_4O_3$) were mixed and heated at 1000° C. for 30 minutes or until the ash content melted, and after cooling, the mixture was immersed in a 5% nitric acid solution, and by an atomic absorption spectrometer (AAS) and an inductively coupled plasma measuring apparatus (ICP), metal elements (ICP: Al, Ba, Ca, Cr, Cu, Fe, Mg, Mn, Ni, Si, Sr, Ti, V, Zn, Zr; AAS: K, Na) were measured and calculated as metal oxides in accordance with the following formulas, whereupon the total amount of the metal oxides was taken as the ash content.

$Na_2O$; ppm=(Na; ppm×$Na_2O$ molecular weight)/2×Na atomic weight $K_2O$; ppm=(K; ppm×$K_2O$ molecular weight)/2×K atomic weight MgO; ppm=(Mg; ppm×MgO molecular weight)/ Mg atomic weight CaO; ppm=(Ca; ppm×CaO molecular weight)/ Ca atomic weight NiO; ppm=(Ni; ppm×NiO molecular weight)/ Ni atomic weight CuO; ppm=(Cu; ppm×CuO molecular weight)/ Cu atomic weight ZnO; ppm=(Zn; ppm×ZnO molecular weight)/ Zn atomic weight SrO; ppm=(Sr; ppm×SrO molecular weight)/ Sr atomic weight BaO; ppm=(Ba; ppm×BaO molecular weight)/ Ba atomic weight $Al_2O_3$; ppm=(Al; ppm×$Al_2O_3$ molecular weight)/2×Al atomic weight $Fe_2O_3$; ppm=(Fe; ppm×$Fe_2O_3$ molecular weight)/2×Fe atomic weight $Cr_2O_3$; ppm=(Cr; ppm×$Cr_2O_3$ molecular weight)/2×Cr atomic weight $V_2O_5$; ppm=(V; ppm×$V_2O_5$ molecular weight)/2×V atomic weight $SiO_2$; ppm=(Si; ppm×$SiO_2$ molecular weight)/Si atomic weight $TiO_2$; ppm=(Ti; ppm×$TiO_2$ molecular weight)/Ti atomic weight $MnO_2$; ppm=(Mn; ppm×$MnO_2$ molecular weight)/Mn atomic weight $ZrO_2$; ppm=(Zr; ppm×$ZrO_2$ molecular weight)/Zr atomic weight (6) Volume resistivity: 30 parts by weight of the granulated acetylene black and 100 parts by weight of an EVA resin ("NUC-3145", tradename, Nippon Yunika K.K.) were kneaded by a kneading test machine ("Laboplastgraph R-60", manufactured by Toyo Seiki Seisakusyo K.K.) having an internal capacity of 60 ml at a blade rotational speed of 30 rpm at a temperature of 120° C. for 10 minutes. The kneaded product was press-molded under heating at 180° C. to obtain a test specimen having a thickness of 1 mm. This specimen was cut into a rectangular parallelopiped of 1×20× 70 mm, and its electrical resistivity was measured by a digital multimeter ("TR-6856", tradename, manufactured by Takeda Riken K.K.).

(7) Specific gravity of a resin molded product: JIS K 6220
(8) Acetylene black yield (%): Calculated by the formula (the specific gravity measured by JIS K 6220×100)÷(the specific gravity calculated from the blend proportions).
(9) Number of agglomerated particles: The test specimen prepared as described above was cut by a microtome to a thickness of 1 $\mu$m, and the dispersed state of acetylene black was inspected by an optical microscope with 100 magnifications, whereby the number of non-dispersed agglomerated particles per $cm^2$, was counted.
(10) Increased fines content degree: The powder ratio of granulated acetylene black was measured in accordance with JIS K 6221. Then, 100 g of the granulated acetylene black was put into a potmill (300 mm×200 mm in diameter) having a baffle plate (width: 30 mm) attached on the inner wall, and the potmill was rotated for 3 minutes at a rotational speed of 30 rpm, whereupon the powder ratio of the acetylene black was measured, and the difference before and after the test was taken as the increased fines content degree.
(11) Pulverization degree: 10 g of granulated acetylene black was put into 100 ml of a measuring cylinder, and the volume was measured. Then, 20 g of the granulated acetylene black and 120 g of polystyrene pellets (3 mm angular) were put into a V-blender (a micro-form see-through type mixer, manufactured by Tsutsui Rikagaku Kikai K.K., 20 cm in height×7 cm in diameter) and pulverized for 20 minutes at 45 rpm. After the pulverization, the acetylene black was passed through a sieve (2 mm) and recovered. Then, 10 g of the recovered acetylene black was put into a 100 ml measuring cylinder, and the volume was measured. The difference in volume before and after the pulverization was taken as the pulverization degree.

(12) Observation of the grain structure: An acetylene black grain was cut by a razor and observed by SEM ("JSM-840", tradename, JEOL Company) with 60 magnifications.

Now, the present invention will be described in further detail with reference to Examples and Comparative Examples. However, it should be understood that the present invention is by no means restricted to such specific Examples.

EXAMPLE 1

Using a pyrolytic furnace, acetylene gas was thermally decomposed at a decomposition temperature of 2400° C. The obtained acetylene black was adjusted to a concentration of 1.0 kg/m$^3$ in air and passed four times through an air classification machine (Vantongeren type). Then, blended to 100 parts by weight of this acetylene black feed powder (water content: 0.01 wt %, iodine adsorption X: 110 mg/g, water content Y calculated by the formula (I): 71.85 wt %) was 300 parts by weight of deionized water (water content of the blend: Y+3.15 wt %). The blend was stirred by a high speed Henshel mixer ("10B Model", tradename, manufactured by Mitsui Miike Seisakusho K.K., volume: 9l) at a stirring rate of 1100 rpm for 5 minutes to carry out granulation of the first stage. Then, blended to 100 parts by weight of the obtained granulated product was 20 parts by weight of the above acetylene black feed powder (water content of the blend: Y−9.35 wt %), and the blend was further stirred at a stirring rate of 1100 rpm for 5 minutes to carry out granulation of the second stage. The granulated product was dried by a drier maintained at a temperature of 150° C. for 20 hours to obtain granulated acetylene black of the present invention. A SEM photograph (60 magnifications) showing the cross-sectional structure of this granulated acetylene black, is shown in FIG. 1.

EXAMPLE 2

Granulated acetylene black was prepared in the same manner as in Example 1 except that the number of passing through the air classification machine was changed to twice.

EXAMPLE 3

Acetylene black feed powder (water content; 0.01 wt %, iodine adsorption X: 30 mg/g, water content Y calculated by the formula (I): 61.22 wt %) was prepared in the same manner as in Example 1 except that the temperature for the thermal decomposition of acetylene was changed to 1500° C., and the number of passing through the air classification machine was changed to twice. Then, granulated acetylene black was prepared in the same manner as in Example 1 except that the amount of deionized water blended for stirring and granulation of the first stage was changed to 200 parts by weight (water content of the blend: Y+5.45 wt %), and the amount of the acetylene black feed powder blended for stirring and granulation of the second stage was changed to 15 parts by weight (water content of the blend: Y−3.25 wt %).

EXAMPLE 4

Granulated acetylene black was prepared in the same manner as in Example 3 except that the amount of deionized water blended for stirring and granulation of the first stage was changed to 250 parts by weight (water content of the blend: Y+10.21 wt %), and the amount of the acetylene black feed powder blended for stirring and granulation of the second stage was changed to 20 parts by weight (water content of the blend: Y−1.70 wt %).

EXAMPLE 5

Granulated acetylene black was prepared in the same manner as in Example 3 except that the amount of deionized water blended for stirring and granulation of the first stage was changed to 200 parts by weight (water content of the blend: Y+5.45 wt %), and the amount of the acetylene black feed powder blended for stirring and granulation of the second stage was changed to 30 parts by weight (water content of the blend: Y−9.91 wt %).

EXAMPLE 6

Acetylene black feed powder (water content: 0.01 wt %, iodine adsorption X: 92 mg/g, water content Y calculated by the formula (I): 68.62 wt %) was prepared in the same manner as in Example 1 except that the temperature for the thermal decomposition of the acetylene was changed to 2000° C. Then, granulated acetylene black was prepared in the same manner as in Example 1 except that the amount of deionized water blended for stirring and granulation of the first stage was changed to 270 parts by weight (water content of the blend: Y+4.35 wt %), and the amount of the acetylene black feed powder blended for stirring and granulation of the second stage was changed to 10 parts by weight (water content of the blend: Y−2.28 wt %).

EXAMPLE 7

Granulated acetylene black was prepared in the same manner as in Example 6 except that the amount of deionized water blended for stirring and granulation of the first stage was changed to 270 parts by weight (water content of the blend: Y+4.35 wt %), and the amount of the acetylene black feed powder blended for stirring and granulation of the second stage was changed to 20 parts by weight (water content of the blend: Y−7.81 wt %).

COMPARATIVE EXAMPLE 1

Granulated acetylene black was prepared in the same manner as in Example 6 except that the amount of deionized water blended for stirring and granulation of the first stage was changed to 350 parts by weight (water content of the blend: Y+9.16 wt %), and the amount of the acetylene black feed powder blended for stirring and granulation of the second stage was changed to 5 parts by weight (water content of the blend: Y+5.46 wt %).

COMPARATIVE EXAMPLE 2

It was attempted to produce granulated acetylene black in the same manner as in Example 3 except that the amount of deionized water blended for stirring and granulation of the first stage was changed to 350 parts by weight (water content of the blend: Y+9.16 wt %), and the amount of the acetylene black feed powder blended for stirring and granulation of the second stage was changed to 80 parts by weight (water content of the blend: Y−25.41 wt %), whereby granulated acetylene black was not obtained.

COMPARATIVE EXAMPLE 3

It was attempted to produce granulated acetylene black in the same manner as in Example 6 except that the amount of deionized water blended for stirring and granulation of the first stage was changed to 380 parts by weight (water content of the blend: Y+10.55 wt %), and the amount of the acetylene black feed powder blended for stirring and granulation of the second stage was changed to 10 parts by weight (water content of the blend: Y+3.35 wt %), whereby the blend became sludge-like in the operation of the first stage and could not be granulated.

COMPARATIVE EXAMPLE 4

Blended to 100 parts by weight of the acetylene black prepared in Example 3, was 170 parts by weight of deionized water (water content of the blend: Y+1.74 wt %), and the blend was subjected to stirring and granulation of the first stage only. Then, the product was dried in a drier maintained at a temperature of 150° C. for 20 hours to obtain granulated acetylene black.

COMPARATIVE EXAMPLE 5

Blended to 100 parts by weight of the acetylene black prepared in Example 6, was 250 parts by weight of deionized water (water content of the blend: Y+2.81 wt %), and the blend was subjected to stirring and granulation of the first stage only. Then, the product was dried in a drier maintained at a temperature of 150° C. for 20 hours to obtain granulated acetylene black. A SEM photograph (60 magnifications) showing the cross-sectional structure of this granulated acetylene black is shown in FIG. 2.

COMPARATIVE EXAMPLE 6

Blended to 100 parts by weight of the acetylene black prepared in Example 6, was 200 parts by weight of an aqueous solution containing 2 wt % of PVA ("K-17E", tradename, manufactured by Denki Kagaku Kogyo K.K.) (water content of the blend: Y−1.95 wt %), and the blend was subjected to stirring and granulation of the first stage only. Then, the product was dried in a drier maintained at a temperature of 150° C. for 20 hours to obtain granulated acetylene black.

The physical properties of the granulated acetylene blacks prepared in Examples 1 to 7 and Comparative Examples 1 to 6 were measured, and the results are shown in Table 1.

TABLE 1

| | Example 1 | Example 2 | Example 3 | Example 4 |
|---|---|---|---|---|
| Acetylene decomposition temp. (° C.) | 2400 | 2400 | 1500 | 1500 |
| Iodine adsorption (mg/g) | 110 | 110 | 30 | 30 |
| Organic binder | Nil | Nil | Nil | Nil |
| Bead strength (g/grain) | 7.2 | 6.9 | 10.5 | 9.6 |
| Bulk densitiy (g/cm$^3$) | 0.32 | 0.31 | 0.41 | 0.38 |
| Grit content (ppm) | 0.5 | 7 | 8 | 7 |
| Ash content (ppm) | 17 | 90 | 90 | 36 |
| Increased fines content degree (%) | 1.8 | 2.8 | 1.8 | 2.0 |
| Pulverization degree (ml) | 14 | 16 | 8 | 9 |
| Number of agglomerated particles (number/cm$^2$) | 0 | 0 | 1 | 0 |
| Volume resistivity (Ω-cm) | 26 | 36 | 40 | 36 |
| Acetylene black yield (%) | 99.78 | 99.68 | 99.91 | 99.87 |

TABLE 1-continued

| | Example 5 | Example 6 | Example 7 | Comparative Example 1 |
|---|---|---|---|---|
| Acetylene decomposition temp. (° C.) | 1500 | 2000 | 2000 | 2000 |
| Iodine adsorption (mg/g) | 30 | 92 | 92 | 92 |
| Organic binder | Nil | Nil | Nil | Nil |
| Bead strength (g/grain) | 9.8 | 9.2 | 9.6 | 5.1 |
| Bulk density (g/cm$^3$) | 0.38 | 0.36 | 0.36 | 0.18 |
| Grit content (ppm) | 7 | 7 | 7 | 8 |
| Ash content (ppm) | 36 | 36 | 36 | 90 |
| Increased fines content degree (%) | 1.2 | 2.1 | 1.2 | 10.2 |
| Pulverization degree (ml) | 7 | 8 | 7 | 41 |
| Number of agglomerated particles (number/cm$^2$) | 0 | 0 | 0 | 0 |
| Volume resistivity (Ω-cm) | 34 | 30 | 28 | 51 |
| Acetylene black yield (%) | 99.92 | 99.87 | 99.90 | 98.94 |

| | Comparative Example 2 | Comparative Example 3 | Comparative Example 4 | Comparative Example 5 | Comparative Example 6 |
|---|---|---|---|---|---|
| Acetylene decomposition temp. (° C.) | 1500 | 2000 | 1500 | 2000 | 2000 |
| Iodine adsorption (mg/g) | 30 | 92 | 30 | 92 | 92 |
| Organic binder | Nil | Nil | Nil | Nil | Present |
| Bead strength (g/grain) | Impossible to granulate | Impossible to granulate | 4.9 | 3.9 | 8.0 |
| Bulk density (g/cm$^3$) | | | 0.27 | 0.18 | 0.36 |
| Grit content (ppm) | | | 8 | 5 | 120 |
| Ash content (ppm) | | | 120 | 45 | 221 |
| Increased fines content degree (%) | | | 10.7 | 12.2 | 4.8 |
| Pulverization degree (ml) | | | 51 | 58 | 14 |
| Number of agglomerated particles (number/cm$^2$) | | | 0 | 0 | 16 |
| Volume resistivity (Ω-cm) | | | 55 | 40 | 98 |

TABLE 1-continued

| | | | |
|---|---|---|---|
| Acetylene black yield (%) | 98.99 | 98.87 | 98.24 |

It is evident from Table 1 that as compared with the granulated acetylene blacks of Comparative Examples, the granulated acetylene blacks of Examples of the present invention have high grain hardness and bulk densities, and their coarse grain content is very low, and the increased fines content degree and the pulverization degree are small. Further, the resin compositions and/or rubber compositions having the granulated acetylene blacks of Examples of the present invention incorporated, are excellent in the electrical conductivity with low volume resistivity and had high acetylene black yields, as compared with those of Comparative Examples.

Further, as is evident from comparison between FIGS. 1 and 2, the granulated acetylene black of the present invention has a structure having a coating layer of acetylene black formed on the surface of granulated acetylene black i.e. a coreshell structure.

The granulated acetylene black of the present invention has merits that it is excellent in the ability for imparting electrical conductivity, dusting after air transportation is little, and designing for blending is easy as the acetylene black yield is high for loading into a resin and/or rubber.

According to the process for producing granulated acetylene black of the present invention, granulated acetylene black excellent in the above properties, can be produced at high productivity.

With a resin composition and/or rubber composition having the granulated acetylene black of the present invention incorporated, it is possible to form a semi-conductive shield for a cable which is substantially free from formation of an electrical tree.

What is claimed is:

1. Granulated acetylene black having a bead strength of at least 5 g/grain measured in accordance with JIS K 6221, a bulk density of at least 0.2 g/cm$^3$ and a grit content of at most 10 ppm.

2. The granulated acetylene black according to claim 1, which has an ash content of at most 100 ppm.

3. The granulated acetylene black according to claim 1, wherein the bead strength is from 5 to 10 g/grain measured in accordance with JIS K 6221, the bulk density is from 0.25 to 0.4 g/cm$^3$, the grit content is at most 10 ppm, and the ash content is at most 50 ppm.

4. The granulated acetylene black according to claim 3, wherein the grit content is at most 1 ppm.

5. A process for producing granulated acetylene black of claim 1, which comprises blending from 200 to 350 parts by weight of deionized water to 100 parts by weight of acetylene black feed powder, followed by granulation of a first stage to obtain a granulated product, and then blending from 10 to 50 parts by weight of acetylene black feed powder to 100 parts by weight of the granulated product, followed by granulation of a second stage.

6. A composition comprising a resin and/or rubber, and the granulated acetylene black as defined in claim 1, incorporated thereto.

7. A composition for a semi-conductive shield for a cable, comprising a resin and/or rubber which is at least one member selected from the group consisting of an ethylene/vinyl acetate copolymer, an ethylene/ethyl acrylate copolymer and an ethylene/butyl acrylate copolymer, in a total amount of 100 parts by weight, and the granulated acetylene black as defined in claim 1, blended thereto, in an amount of from 30 to 100 parts by weight.

8. The process of claim 5, wherein said process does not include adding a binder.

* * * * *